United States Patent [19]

Gutleber

[11] Patent Number: 4,511,885
[45] Date of Patent: Apr. 16, 1985

[54] CODE COMPRESSOR FOR MULTILEVEL INTERLEAVED MULTIPLEXED NOISE CODES

[75] Inventor: Frank S. Gutleber, Little Silver, N.J.

[73] Assignee: The United States of America as represented by the Secretary of the Army, Washington, D.C.

[21] Appl. No.: 555,774

[22] Filed: Nov. 28, 1983

[51] Int. Cl.³ .............................................. H03K 13/24
[52] U.S. Cl. .............................. 340/347 DD; 375/34; 375/38; 375/17; 375/96; 370/18
[58] Field of Search ................... 375/1, 17, 25, 34, 38, 375/96, 102, 103; 370/18, 19, 21; 364/604, 728, 364/819; 340/347 DD, 348, 349, 350, 353

[56] References Cited

U.S. PATENT DOCUMENTS

| | | | |
|---|---|---|---|
| 3,461,451 | 8/1969 | Gutleber | 340/348 |
| 3,519,746 | 7/1970 | Gutleber | 370/18 |
| 3,634,765 | 1/1972 | Gutleber | 375/34 |
| 4,293,953 | 10/1981 | Gutleber | 375/25 |
| 4,471,342 | 9/1984 | Gutleber | 375/25 |

Primary Examiner—Robert L. Griffin
Assistant Examiner—Raymond C. Glenny
Attorney, Agent, or Firm—Anthony T. Lane; Michael Zelenka; Jeremiah G. Murray

[57] ABSTRACT

Multilevel code mates A and B expanded in accordance with the expression $A=(a)I\ (b^K)$ and $B=(a^K)I\ (\bar{b})$ are compressed to a lobeless basic mate pair by repeatedly compressing corresponding code mate pairs in successive stages to provide diminishing codes of half the number of code bits by amplifying the code mates by a predetermined amplification factor and then adding and subtracting the code mates in accordance with expressions $A_{i-1}=A_i+B_i^{K_i}$ and $B_{i-1}=A_i^{K_i}-B_i$ where i is the $i_{th}$ compression stage and $K_i$ is the amplification factor applied to the codes $A_i$ and $B_i$.

21 Claims, 4 Drawing Figures

FIG. 4

CODE COMPRESSOR FOR MULTILEVEL INTERLEAVED MULTIPLEXED NOISE CODES

The invention described herein may be manufactured, used and licensed by or for the Government for governmental purposes without the payment of any royalties thereon or therefor.

CROSS REFERENCE TO RELATED APPLICATIONS

This invention is related to the following co-pending applications filed in the name of the present inventor:

U.S. Ser. No. 502,416, now abandoned, entitled, "Code Compressor For Interleaved Multiplexed Noise Codes", filed in the name of the present inventor on June 8, 1983;

U.S. Ser. No. 456,157, now U.S. Pat. No. 4,471,342, entitled, "Pulse Compressor For Multiplexed Noise Codes", filed in the name of the present inventor on Jan. 6, 1983;

U.S. Ser. No. 533,183, entitled, "Multilevel Noise Code Mate Pair Generation And Utilization Of Such Codes", filed in the name of the present inventor on Sept. 19, 1983;

U.S. Ser. No. 550,853, entitled, "Code Generator For Multilevel Interleaved Multiplexed Noise Codes", filed in the name of the present inventor on Nov. 14, 1983; and U.S. Ser. No. 551,431, entitled, "Multilevel Mate Pair Code Compressor For Codes Expanded By The Process Of Butting", filed in the name of the present inventor on Nov. 14, 1983.

FIELD OF THE INVENTION

This invention relates generally to the compression of noise codes having autocorrelation functions which upon detection with a matched filter provides an impulse and more particularly to the compression of such codes comprised of expanded multilevel, multiplexed noise code mate pairs generated by the process of interleaving.

BACKGROUND OF THE INVENTION

Radio communications systems utilizing multiplexed noise codes are generally known. A typical example is shown and described in U.S. Pat. No. 4,293,953, entitled, "Bi-Orthogonal PCM Communications System Employing Multiplexed Noise Codes," which issued to Frank S. Gutleber, the present inventor, on Oct. 6, 1981.

The concept of code expansion and compression for the general class of multiplexed noise codes comprised of noise code mate pairs having autocorrelation functions which upon detection in a matched filter provide an impulse is also generally known. Such concepts are disclosed, for example, in U.S. Pat. No. 3,461,451, entitled, "Code Generator To Produce Permutations Of Code Mates", which issued to the present inventor on Aug. 12, 1969; U.S. Pat. No. 3,519,746, entitled, "Means And Methods To Obtain An Impulse Autocorrelation Function" which issued to the present inventor on July 7, 1970; and U.S. Pat. No. 3,634,765, entitled, "System To Provide An Impulse Autocorrelation Function ..." which issued to the present inventor on Jan. 11, 1972.

In the above mentioned related application, U.S. Ser. No. 502,416, now abandoned, entitled, "Code Compressor For Interleaved Multiplexed Noise Codes", there is disclosed the concept of repetitively compressing corresponding code mate pairs in successive stages to provide ever diminishing codes of half the bit quantity and twice the amplitude until a single pulse results at the location of the final code bit whose amplitude is increased by a factor of twice the number of bits in each of the original interleaved codes. The apparatus employed comprises a series of cascaded code separators separated by delay lines providing ever increasing delays which are multiples of the pulsewidth of each code bit and wherein the delay is doubled at each stage until the last stage is reached and a delay of one half the original code length of the interleaved codes is provided, whereupon a combining of the codes results in an impulse autocorrelation function.

In the above referenced related application U.S. Ser. No. 551,431, entitled, "Multilevel Mate Pair Code Compressor For Codes Expanded By The Process Of Butting", there is disclosed the concept of compressing multilevel, multiplexed code mate pairs by repeatedly compressing corresponding code mate pairs in successive stages to provide diminishing codes of half the code length by amplifying the code mates by a predetermined amplification factor and then adding and subtracting the code mates in accordance with the following general rule:

$$A_{i-1} = A_i + B_i^{K_i}$$

and $$B_{i-1} = A_i^{K_i} - B_i$$

where i is the $i_{th}$ compression stage and the exponent $K_i$ is the amplification factor for the $i_{th}$ stage. During the compression process, however, an ever decreasing time delay equal to half the input code width is provided so that the respective code mates generated by butting line up with one another in a time coincident relationship.

Accordingly, it is an object of the present invention to provide an improvement in the compression of noise codes.

Another object of the present invention is to provide an improvement in compression of multiplexed code mate pairs having more than one amplitude level.

Still another object of the invention is to provide an improvement in the compression of multilevel, multiplexed code mate pairs generated by the process of interleaving code mates.

SUMMARY

These and other objects are achieved by compressing multilevel, multiplexed code mate pairs that result from the expansion of code mates using a code interleaving process which utilizes the repeated application of an expansion rule forming expanded Codes A and B in accordance with the following expressions: $A = -(a)I(b^K)$, and $B = (a^K)I(\bar{b})$ where the component K represents the amplification factor of the code bits of codes a and b, $\bar{b}$ represents the complement or negative of code b, and the I signifies that code b is interleaved with code a, that is, $(a)I(b) = a_1, b_1, a_2, b_2, \ldots a_n, b_n$. Furthermore, in the expansion processss, any of the four sub-elements making up the expanded code may be inverted or made negative and the amplified segments can, when desired, be transposed.

The code mates thus expanded are compressed in this invention to a lobeless basic mate pair by repeatedly compressing corresponding code mate pairs in successive stages to provide diminishing codes of one half of the number of code bits included in the applied code mate pair by amplifying the code mates by a predetermined amplification factor, lining up the code mates in time coincidence, and then adding and subtracting the code mates in accordance with the following general rule:

$$A_{i-1} = A_i + B_i^{K_i}$$

and $$B_{i-1} = A_i^{K_i} - B_i$$

where i is the $i_{th}$ compression stage, and the exponent $K_i$ is the amplification factor for the $i_{th}$ stage and furthermore, an ever increasing time delay equal to a multiple of the code bit width is provided, which doubles at each stage so that the code mates at each compression stage line up in time coincidence with one another.

BRIEF DESCRIPTION OF THE DRAWINGS

FIG. 4 is a time related diagram of the interleaved code compression process provided by the compressor shown in FIG. 3.

DESCRIPTION OF THE PREFERRED EMBODIMENT

Figure 1:
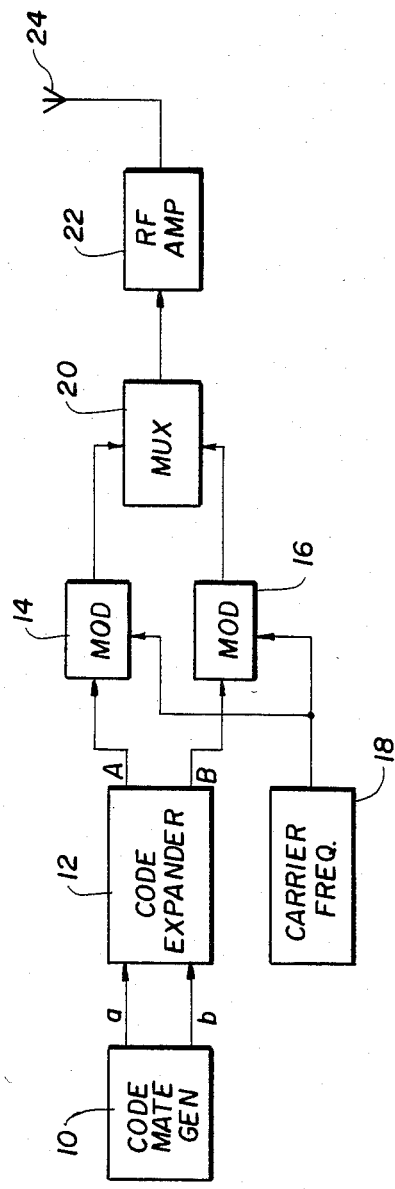
FIG. 1 is a functional block diagram illustrative of transmitter apparatus for a noise modulated communications system utilizing a pair of expanded multilevel code mates generated by the process of interleaving.

The present invention is directed to digital codes referred to as noise codes, meaning that the information is coded with a code that is "noise like" and that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are multiplexed, matched filter detected and linearly added, there is provided a lobeless impulse output of relatively high amplitude at one given time ($\tau = 0$) and zero output at all other times ($\tau \neq 0$). Mathematically, for a pair of code mates a and b, $$\emptyset_a(\tau) = -\emptyset_b(\tau) \tag{1}$$

for all $\tau \neq 0$, where $\emptyset_a(\tau)$ is the autocorrelation function of code a, $\emptyset_b(\tau)$ is the autocorrelation function of code b and wherein $\tau = 0$ is the location of the main lobe.

In the above referenced related application Ser. No. 550,853, entitled, "Code Generator For Multilevel Interleaved Multiplexed Noise Codes", there is disclosed a code expansion process which results in multilevel code mate pairs which meet the requirement of equation (1) while being generated by the repeated application of the following general rule:

$$A = (a)I(b^K) \tag{2}$$

$$B = (a^K)I(\overline{b}) \tag{3}$$

where the exponent K signifies an amplitude gain factor of the code bits $a_1, a_2 \ldots a_n$ in code a and $b_1, b_2 \ldots b_n$ in code b, $\overline{b}$ represents the complement or negative of code b and wherein I signifies that the two codes a and b are interleaved, i.e., $(a)I(b) = a_1, b_1, a_2, b_2, \ldots a_n, b_n$. Further in the expansion process signified by equations (2) and (3), any of the four sub-elements making up the expanded code could be made negative, and/or the amplified segments may be transposed.

Returning attention now to the present invention, consider for purposes of illustration a multilevel code mate pair $A_3$ and $B_3$ which have been generated in accordance with the expansion rule expressed in equations (2) and (3). The expansion process, furthermore, can be illustrated in the following example. Letting a and b represent the basic code mate pair, using the aforementioned expansion rule results in $A_1$ and $B_1$ being developed as:

$$A_1 = (a)I(b^{K_1}) \tag{4}$$

$$B_1 = (a^{K_1})I(\overline{b}) \tag{5}$$

Expanding codes $A_1$ and $B_1$ yields codes $A_2$ and $B_2$ which can be expressed as:

$$A_2 = (A_1)I(B_1^{K_2}) \tag{6}$$

$$B_2 = (A_1^{K_2})I(\overline{B_1}) \tag{7}$$

The expansion process can be repeated any number of times in p successive stages where in general each expansion stage can be defined by the following general expressions:

$$A_{i+1} = (A_i)I(B_i^{K_i}) \tag{8}$$

$$B_{i+1} = (A_i^{K_i})I(B_i) \tag{9}$$

Rather than compressing the two expanded codes $A_n$ and $B_n$ in a conventional matched filter, the present invention compresses the codes collectively rather than individually. An inspection of the two codes, for example, $A_n = A_3$ and $B_n = B_3$ as shown in FIG. 4 reveals that compression of these codes results when the following mathematical operations are performed, resulting in amplified versions of compressed codes $A_2$ and $B_2$ being generated as code mates in the following manner:

$$A_2' = A_3 + B_3^{K_3} \tag{10}$$

$$B_2' = A_3^{K_3} - B_3 \tag{11}$$

Figure 4:
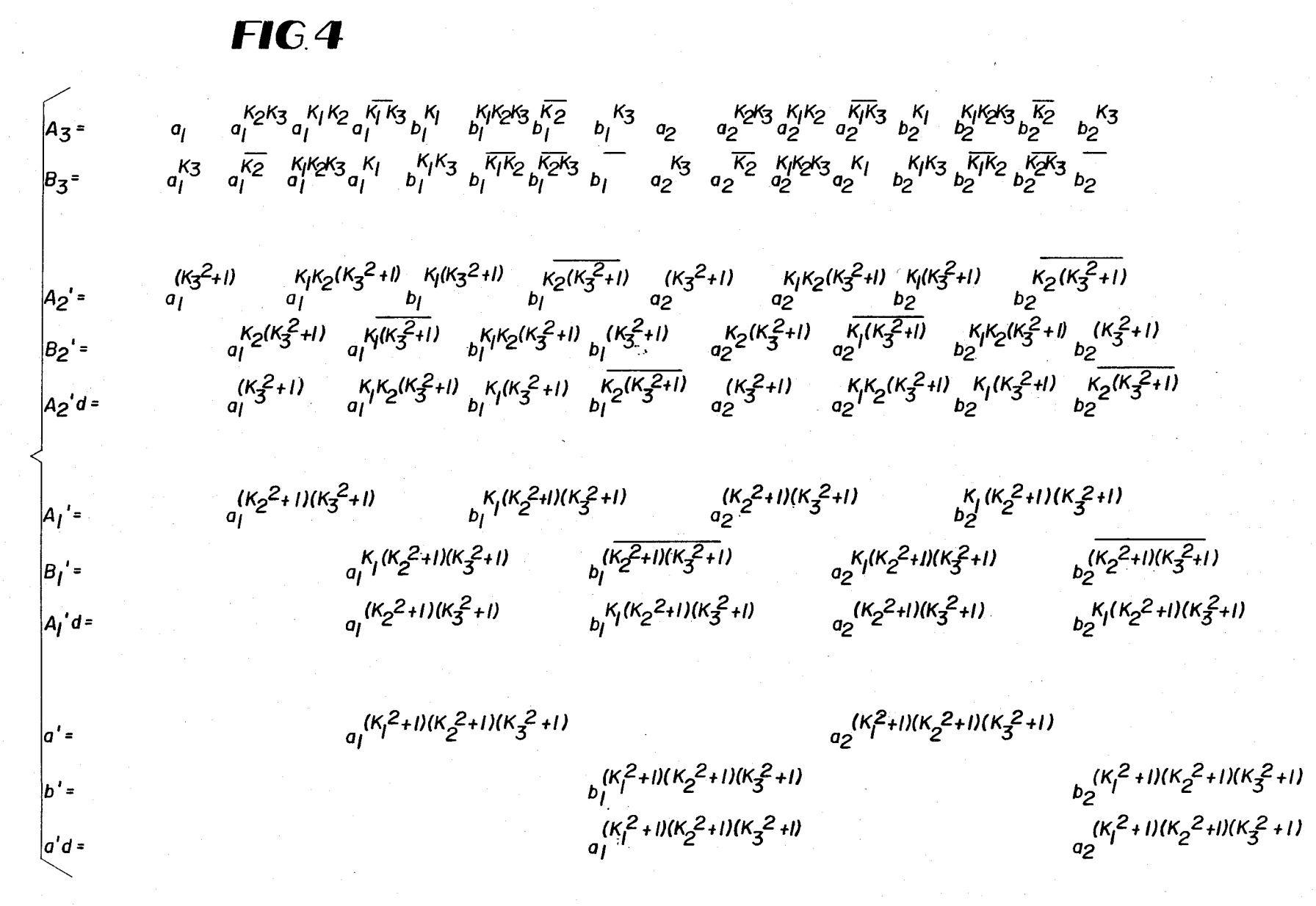

Utilizing the above relationships results in codes $A_2'$ and $B_2'$ in FIG. 4 being expressed as:

$$A_2' = a_1^{(K_32+1)}, a_1^{K_1K_2(K_32+1)}, b_1^{K_1(K_32+1)}, \tag{12}$$

$$\overline{b_1^{K_2(K_32+1)}}, \ldots, b_2^{K_1(K_32+1)}, \overline{b_2^{K_2(K_32+1)}}$$

$$B_2' = a_1^{K_2(K_32+1)}, a_1^{K_1(K_32+1)}, b_1^{K_1K_2(K_32+1)}, \tag{13}$$

-continued $$b_1^{(K_3^2+1)}, \ldots, b_2^{K_1K_2(K_3^2+1)}, b_2^{(K_3^2+1)}$$

It can be shown, for example, by reference to related application Ser. No. 550,853 that $A_2'$ and $B_2'$ are equal to $A_2$ and $B_2$ multiplied by $(K_3^2+1)$. An inspection of those two compressed codes reveals that the same general operation can provide an amplified version of further compressed code mates $A_1$ and $B_1$, resulting in codes $A_1'$ and $B_1'$ being generated when utilizing a multiplying factor $K_2$ and lining up the two codes by applying a time delay of one code bit width $(\tau)$. These codes can be expressed as:

$$A_1' = A_2 + B_2^{K_2} \tag{14}$$

$$B_1' = A_2^{K_2} - B_2 \tag{15}$$

Performing these operations results in:

$$A_1' = a_1^{(K_2^2+1)(K_3^2+1)}, b_1^{K_1(K_2^2+1)(K_3^2+1)}, \tag{16}$$

$$a_2^{(K_2^2+1)(K_3^2+1)}, b_2^{K_1(K_2^2+1)(K_3^2+1)}$$

$$B_1' = a_1^{K_1(K_2^2+1)(K_3^2+1)}, b_1^{(K_2^2+1)(K_3^2+1)}, \tag{17}$$

$$a_2^{K_1(K_2^2+1)(K_3^2+1)}, b_2^{(K_2^2+1)(K_3^2+1)}$$

$$A_o' = A_1 + B_1^{K_1} \tag{18}$$

$$B_o' = A_1^{K_1} - B_1 \tag{19}$$

Applying these compression equations yields:

$$A_o' = a_1^{(K_1^2+1)(K_2^2+1)(K_3^2+1)}, \tag{20}$$

$$a_2^{(K_1^2+1)(K_2^2+1)(K_3^2+1)},$$

$$B_o' = b_1^{(K_1^2+1)(K_2^2+1)(K_3^2+1)}, \tag{21}$$

$$b_2^{(K_1^2+1)(K_2^2+)(K_3^2+1)},$$

It can be seen from equations (20) and (21) that the multilevel mate pairs $A_3$ and $B_3$ have been compressed down to a basic mate pair a and b amplified by the factor $(K_1^2+1)(K_2^2+1)(K_3^2+1)$ which corresponds to the coherent summation of the individual bits and is equal to that which would result from a matched filter detector i.e. $\emptyset_{A3}(\tau)$ and $\emptyset_{B3}(\tau)$, in accordance with the known prior art. Further, by delaying code mate $A_o'$ by a time delay of $4\tau$, i.e. doubling that of the previous stage, codes $A_o'$ and $B_o'$ line up whereupon they can be linearly added to further compress the basic mate codes a and b. Since a and b form a mate pair, they can be compressed down to a single impulse autocorrelation function using appropriate compression stages. For example, if $a=a_1 \ldots a_2=1 \ldots 0$ and $b=b_1 \ldots b_2=0 \ldots 0$, then $A_o'$ and $B_o'$ can be compressed to a single impulse as shown below.

Adding $A_o'd$ and $B_o'$ yields $$1^x \ldots 0^x \tag{22}$$
$$\underline{0^x \ldots 0^x} \tag{23}$$
$$\ldots 0^{2x} \tag{24}$$

Subtracting (22) from (23) results in $$1^x \ldots 0^x \tag{25}$$
$$\underline{0^x \ldots 0^x} \tag{26}$$
$$0^{2x} \ldots \tag{27}$$

And delaying the output given by (27) by $8\tau$ lines up the two impulse signals [(24) and (27)] and adding them then provides a final single impulse output equal to $0^{4x}$ where $x = (K_1^2+1)(K_2^2+1)(K_3^2+1)$.

Thus what has been shown and described is a compression process wherein codes generated from the general expansion rule set forth in equations (10) and (11) are coherently compressed to a lobeless basic mate pair by repeatedly applying the following general operation:

$$A_{i-1} = A_i + B_i^{K_i} \tag{28}$$

$$B_{i-1} = A_i^{K_i} - B_i \tag{29}$$

This process is similar to that utilized for compression multilevel butted code mates as disclosed in related application U.S. Ser. No. 551,431 except that now the time delay between compression stages is successively doubled whereas in the former case it is successively decreased in order to provide time coincidence between code mates.

Figure 2:
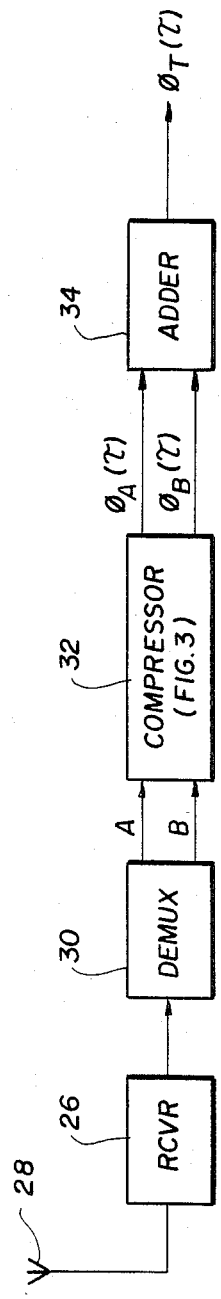
FIG. 2 is a functional block diagram of receiver apparatus of a noise modulated communication system for receiving and compressing the expanded multilevel codes in accordance with the principles of the invention.
Figure 3:
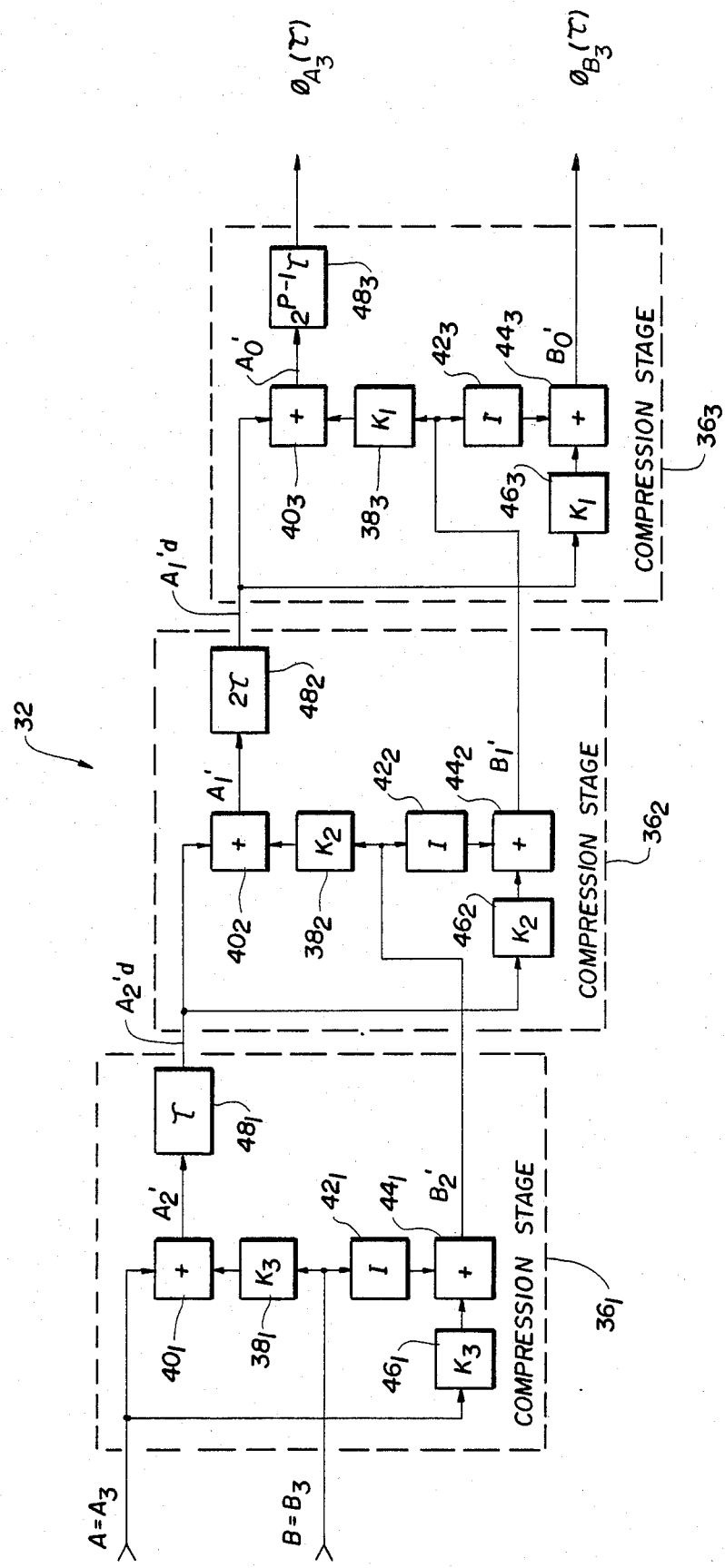
FIG. 3 is a diagram illustrative of an embodiment of the code compressor shown in FIG. 2.

While a functional block diagram of a code compressor which is operable to perform the operations identified above is shown in FIG. 3, a noise modulated pulse communications system employing such codes is typically disclosed in FIGS. 1 and 2.

Referring first to FIG. 1, reference numeral 10 denotes a basic code mate generator for generating code mates a and b and which are utilized to generate multilevel expanded codes A and B in accordance with the foregoing description. The codes a and b are fed out in a time related multi-bit binary digital sequence to code expander apparatus designated by reference numeral 12 and which are generated, for example, in accordance with the expansion process disclosed in related application, U.S. Ser. No. 550,853, entitled, "Code Generator For Multilevel Interleaved Multiplexed Noise Codes". The expanded multilevel codes A and B are applied to respective modulator circuits 14 and 16 which additionally have applied thereto a carrier frequency generated by a carrier frequency generator 18. The output of the modulators 14 and 16 comprise, for example, separate bi-phase modulated codes which are fed to a multiplexer 20 which operate to either time or frequency multiplex the carrier modulated signals A and B. The output of the multiplexer 20 is fed to an RF amplifier 22 where an RF carrier containing the multiplexed codes A and B are radiated from an antenna 24.

With respect to FIG. 2, there is disclosed receiver apparatus which is responsive to the RF signal radiated from the antenna 24 and containing the codes A and B. Accordingly, the radio receiver apparatus is shown coupled to a receiving antenna 28 which is operable to translate the multiplexed codes A and B at the RF frequency to an IF frequency whereupon they are fed to a demultiplexer 30. The demultiplexer is operable to output the expanded multilevel codes A and B separately where they are applied to a code compressor 32, the details of which are shown in FIG. 3 and which is operable to generate the basic mate pair code outputs of $A_o'$ and $B_o'$ to provide respective autocorrelation function outputs $\emptyset_{A3}(\tau)$ and $\emptyset_{B3}(\tau)$. The autocorrelation function outputs of the compressor 32 can then be applied to appropriate compression stages that are operable to develop a substantially lobeless single impulse output signal $\phi_T(\tau)$.

Referring now to FIG. 3, there is disclosed a functional block diagram of the compressor 32 shown in FIG. 2 where $A = A_3$ and $B = B_3$. The compressor as shown in FIG. 3 is comprised of three compressor stages $36_1$, $36_2$ and $36_3$, each of which separately implements the compression process defined by the general equations (22) and (23). The first expansion stage $36_1$ implements the mathematical operations set forth in equations (10) and (11) whereupon the input multilevel code mates $A_3$ and $B_3$ are compressed into the compressed codes $A_2'$ and $B_2'$. As shown, input code $B_3$ is fed to an amplification stage comprised of a pulse amplifier $38_1$ where it is amplified by the gain factor $K_3$. The output of the amplifier $38_1$ is fed to a first linear adder $40_1$ which also is coupled to the other input code $A_3$. The output of the adder $40_1$ comprises a compressed code $A_2'$ in accordance with equation (10). The code mate of $A_2'$ is obtained by feeding the code $B_3$ to a signal inverter $42_1$ which is operable to change the polarity of a positive pulse to a negative pulse and vice versa, and thus outputs the complement or negative of code $B_3$, i.e. $\overline{B_3}$. The code output from the inverter $42_1$ is fed to a second linear adder $44_1$ along with the code $A_3$ which has been multiplied by the gain factor $K_3$ in the amplifier $46_1$. Since an algebraic subtraction can be obtained by changing the sign of the subtrahend and thereafter performing an addition, the adder $44_1$ provides an output of code $B_2'$ as defined in equation (11). As shown in FIG. 4, the compressed code $B_2'$ is actually delayed in time relative to the code $A_2'$ by one code bit slot width ($\tau$) which is the time duration of one code bit $a_i$ or $b_i$. It becomes necessary, therefore, to time delay the compressed code $A_2'$ by a time $\tau$ to line it up with the delayed code $B_2'$ prior to compressing the codes in the next or succeeding compression stage $36_2$. This is provided by the time delay device $48_1$ which typically comprises a delay line, a well known piece of apparatus.

Referring now to the second compression stage $36_2$, the code $B_2'$ is amplified by the gain factor $K_2$ in the amplifier $38_2$ and added to the delayed code $A_2'd$ in the linear adder $40_2$ providing a double compressed output code of $A_1'$. The code mate to $A_1'$ is obtained by inverting the code $B_2'$ in the inverter $42_2$ and adding it to the delayed code $A_2'd$ after amplifying it by a factor $K_2$ in the amplifier $46_2$. Thus equations (14) and (15) are implemented.

The base codes a and b are obtained utilizing a third compression stage $36_3$ which is identical to the preceding stages with the exception of the time delay provided by the time delays $48_1$ and $48_2$ which respectively double at each stage to a final delay of $2^{p-1} \times \tau$ where p is the number of compression stages. As shown, the $A_1'$ code mate provided by the second compression stage $36_2$ is delayed by a time delay of $2\tau$ in the delay device $48_2$ in order to line up the codes $A_1'$ and $B_1'$. As before, the code $B_1'$ is amplified by a gain factor $K_1$ in the amplifier $38_3$ where it is added to the delayed code $A_1'd$ in the adder $40_3$ to yield the code $A_o'$ in accordance with equation (20). Code $B_o'$ is achieved by inverting the code $B_1'$ by the inverter $42_3$ and adding it to the delayed code $A_1'd$ after amplifying by a factor $K_1$ in the amplifier $46_3$. Codes $A_o'$ and $B_o'$ correspond to the original code mate pairs a and b but now amplified by the gain factor $(K_1^2+1)(K_2^2+1)(K_3^2+1)$. In order to continue compressing the basic mate code pairs requires that a third delay device $48_3$ provide a time delay of $2^{p-1} \times \tau = 4\tau$ to make the two codes line up.

Although the pulse compressor shown in FIG. 3 has beed described for apparatus compressing a code length of 8n where n corresponds to the number of code bits $a_1 \ldots a_n$ and $b_1 \ldots b_n$ in each basic code mate a and b, the repeated application of the process described at each compression stage can compress a code structure of any length down to the basic code mate pair. The compressed codes, moreover, are lobeless and are obtained with much less hardware than that required for other known approaches. For a code length comprising N blocks of n bits, only p compression stages are needed to compress the code down to n bits where $2^p = N$. For example, with $n = 1$ only $p = 10$ compression stages with each stage including one delay device, two amplifiers, two adders and an inverter would be required to compress a 1024 bit code down to a lobeless impulse.

Thus what has been shown and described is the concept of compressing multilevel code mate pairs that have been generated by interleaving two code mates having autocorrelation functions of codes that are equal in magnitude but of opposite sense for all values of time delay $\tau$ except at $\tau = 0$. These codes, moreover, can when appropriately utilized improve the entire field of communications since they are capable of optimizing all transmission systems including not only communications systems, but also multiple access systems, radar systems, altimeters, fuses, missile guidance, navigation, traffic control, etc. by reducing self-interference, providing anti-jam (A/J) protection, low probability of intercept (LPI), as well as providing increased range and velocity resolution and their accuracy of measurement.

Having thus shown and described what is at present considered to be the preferred method and means for implementing the subject invention, it is noted that the same has been made by way of illustration and not limitation. Accordingly, all modifications, alterations and substitutions may be made without departing from the spirit and scope of the invention as set forth in the appended claims.

I claim:

1. A method of compressing a pair of multilevel expanded digital noise codes comprised of first and second multilevel code mates in a plurality of successive stages where the expanded noise code are comprised of a predetermined number of code bits defining the code length of said code mates, comprising the steps of:

at each stage, applying first and second multilevel expanded code mates;

generating third and fourth multilevel code mates by respectively multiplying said first and second code mates by a predetermined gain factor not necessarily equalling unity;

combining said first multilevel code mate with said fourth multilevel code mate in a first mathematical sense to form a first compressed code mate having one half the number of code bits of the preceding stage;

combining said third multilevel code mate with said second multilevel code mate in a second mathematical sense to form a second compressed code mate also having one half the number of code bits of the preceding stage; and delaying said first compressed code mate by a time delay equal to an integer multiple of the time duration of a code bit prior to applying said first and second compressed code mates to the next stage whereby said compressed code mates become input code mates for the said next stage.

2. The method of claim 1 wherein said time delay is doubled in each succeeding stage of said plurality of successive stages.

3. The method of claim 2 wherein said integer multiple of the first stage of said plurality of stages is unity.

4. The method of claim 2 wherein said step of combining in a first mathematical sense comprises the step of adding said first and fourth multilevel code mates.

5. The method of claim 4 wherein said step of combining in a second mathematical sense comprises the step of subtracting said second multilevel code mate from said third multilevel code mate.

6. The method of claim 4 wherein said step of combining in a second mathematical sense comprises the step of generating the complement of said second multilevel code mate and adding it to said third code mate.

7. The method of claim 2 wherein said pair of multilevel noise codes comprise expanded code mates formed by interleaving code mate pairs.

8. The method of claim 7 wherein said code mate pairs comprise equal length binary noise codes.

9. The method of claim 8 wherein said code mate pairs comprise noise codes wherein the pair of compressed code mates of the last stage comprise an impulse autocorrelation function.

10. The method of claim 1 and additionally including the steps of:
generating a pair of multilevel noise codes comprised of said first and second multilevel code mates;
multiplexing said pair of multilevel noise codes;
modulating said multiplexed expanded noise codes on an RF carrier of communications apparatus and radiating said carrier;
receiving and demodulating said carrier in communications apparatus to provide a multiplexed coded received signal;
demultiplexing said received signal to provide respective coded signals of said pair of multilevel noise codes; and
thereafter executing the above recited compression steps.

11. The method of claim 1 wherein each stage comprises one of p successive stages which operate to compress $N = 2^p$ code bits down to a last pair of basic code mate signals respectively comprising n bit signals.

12. Apparatus for compressing a pair of expanded noise codes comprised of first and second multilevel code mates and having a predetermined number of code bits defining the code length of said code mates, comprising:
a plurality of series coupled compression stages, each stage including,
means for generating third and fourth multilevel code mates respectively comprised of first and second multilevel input code mates multiplied by a predetermined gain factor not necessarily equalling unity;
means for combining said first multilevel code mate with said fourth multilevel code mate in a first manner to form a first compressed code mate having one half the number of code bits of the first and second multilevel input code mates;
means for combining said third multilevel code mate with said second multilevel code mate in a second manner to form a second compressed code mate also having one half the number of code bits of the first and second input code mates; and
means for delaying said first compressed code mate by a time delay equal to an integer multiple of the code bit width of said codes for providing a first output code mate coincident in time with said second compressed code mate, said second compressed code mate being a second output code mate.

13. The apparatus of claim 12 and wherein said means for combining in a first manner comprises means for linearly adding said first multilevel code mate with said fourth multilevel code mate.

14. The apparatus of claim 13 wherein said means for combining in a second manner comprises means for linearly subtracting said second multilevel code mate from said third multilevel code mate.

15. The apparatus of claim 13 wherein said means for combining in a second manner comprises means for generating the complement of said second multilevel code mate, and means for linearly adding said third multilevel code mate to said complement of said second multilevel code mate.

16. The apparatus of claim 12 wherein said pair of code mates comprise equal length binary noise codes.

17. The apparatus of claim 12 wherein said pair of multilevel noise codes comprise noise codes producing impulse autocorrelation functions when compressed to a single code bit.

18. The apparatus of claim 12 wherein said pair of multilevel noise codes comprise expanded multibit code mates generated by interleaving one code mate having a first amplitude with the other code mate having a second amplitude.

19. The apparatus of claim 12 and further comprising:
means for generating said pair of expanded multilevel noise codes;
means for multiplexing said pair of multilevel noise codes;
communications apparatus including means for modulating said multiplexed expanded noise codes on an RF carrier and radiating said carrier;
communications apparatus including means for receiving and demodulating said carrier to provide a multiplexed coded receive signal;
means for demultiplexing said received signal to provide respective coded signals of said pair of expanded noise codes, and
means coupling said demultiplexed multilevel noise codes to the first of said plurality of compression stages.

20. The apparatus of claim 19 wherein said means for generating said pair of expanded multilevel noise codes includes means for generating and interleaving multilevel code mate pairs to form said first and second multilevel code mates.

21. The apparatus of claim 12 and additionally including linear adder means coupled to the final stage of said plurality of compression stages for combining said first and second compressed output code mates to provide for compression to a single code bit output signal.

* * * * *